United States Patent
Huffman et al.

(10) Patent No.: US 7,757,989 B1
(45) Date of Patent: Jul. 20, 2010

(54) TEASER REEL WITH ALARM

(75) Inventors: Carl T. Huffman, Greensboro, NC (US); Lonnie H. Gilbert, Greensboro, NC (US)

(73) Assignee: Electric Fishing Reel Systems, Inc., Greensboro, NC (US)

( * ) Notice: Subject to any disclaimer, the term of this patent is extended or adjusted under 35 U.S.C. 154(b) by 0 days.

(21) Appl. No.: 12/494,640

(22) Filed: Jun. 30, 2009

(51) Int. Cl.
*A01K 89/00* (2006.01)

(52) U.S. Cl. .................................. 242/306; 43/27.4

(58) Field of Classification Search ............... 242/306; 43/27.4; 114/253
See application file for complete search history.

(56) References Cited

U.S. PATENT DOCUMENTS

| | | | | |
|---|---|---|---|---|
| 1,114,084 A * | 10/1914 | Wells | ................. | 242/229 |
| 1,470,640 A * | 10/1923 | Pelletier | ................. | 242/265 |
| 2,706,095 A * | 4/1955 | Goodall | ................. | 242/235 |
| 3,355,835 A * | 12/1967 | Lyons | ................. | 43/6.5 |
| 3,741,493 A * | 6/1973 | Jones | ................. | 242/296 |
| 4,549,703 A * | 10/1985 | Atobe | ................. | 242/288 |
| D364,913 S * | 12/1995 | Daffern | ................. | D22/137 |
| 5,544,832 A * | 8/1996 | Okamoto | ................. | 242/245 |
| 5,752,461 A * | 5/1998 | Whisenhunt | ................. | 114/253 |
| 6,003,800 A * | 12/1999 | Adenot et al. | ................. | 242/306 |
| 6,155,508 A * | 12/2000 | Lepage | ................. | 242/303 |
| 6,189,822 B1 * | 2/2001 | Ikuta | ................. | 242/296 |
| 6,505,431 B1 * | 1/2003 | Christian et al. | ................. | 43/21.2 |
| 6,678,990 B2 * | 1/2004 | Cox | ................. | 43/19.2 |
| D497,968 S | 11/2004 | Huffman | ................. | D22/137 |
| 7,175,121 B2 * | 2/2007 | Ikuta | ................. | 242/307 |
| 7,222,810 B1 * | 5/2007 | Littau et al. | ................. | 242/305 |
| 7,226,013 B1 * | 6/2007 | Kang | ................. | 242/306 |
| 7,322,226 B1 * | 1/2008 | Rathgeb | ................. | 43/42.15 |
| 2004/0206840 A1 * | 10/2004 | Kitajima | ................. | 242/306 |
| 2005/0006512 A1 * | 1/2005 | Morimoto et al. | ................. | 242/306 |
| 2009/0179100 A1 * | 7/2009 | Crofoot | ................. | 242/292 |

OTHER PUBLICATIONS

A three (3) page printout from the website of "reelcolors" entitled: Custom Teaser Reels, undated.
A One (1) page printout from TGM Marine Inc. showing three teaser reels, undated.
A two (2) page printout from SportTeaser, Inc. showing "Stainless Steel Teaser Reels for All Boats", copyright 2006 SportTeaser.

* cited by examiner

*Primary Examiner*—Evan H Langdon

(57) ABSTRACT

A teaser reel with an audible alarm and line guide provides awareness and protection while trolling for fish. The teaser reel alerts boat personnel that the dredge is being struck by fish and allows quick action to be taken to protect the dredge from damage or loss. The audible alarm consists of a cogwheel affixed to a teaser reel spool with a pivotable pawl positioned contiguous the cogwheel. As the spool turns the pawl strikes each cog in succession to emit a loud, shrill sound. A dredge line guide is also affixed to the teaser reel to prevent damage and injury to boat personnel from inadvertent unwinding of the dredge line into the boat.

10 Claims, 4 Drawing Sheets

TEASER REEL WITH ALARM

FIELD OF THE INVENTION

The invention herein pertains to teasers as are used on fishing boats and particularly pertains to a teaser reel having an audible alarm.

DESCRIPTION OF THE PRIOR ART AND OBJECTIVES OF THE INVENTION

Teasers have been used for many years for deep water fishing. Conventional teasers include a reel, dredge line and a dredge of suitable construction carrying one or more fish facsimiles to imitate a school of fish. Such dredges attract large fish that hopefully will strike a lure or baited hook positioned in close proximity to the dredge. While such teasers are effective in luring fish, one of the main problems associated therewith is that sometimes large fish attack the dredge, destroying it or breaking the dredge line causing it to be lost. This can happen quickly and fishermen and other boat personnel oftentimes are not aware that the dredge is being struck. At other times the dredge line will inadvertently unwind from the teaser reel during dredging, causing the line to fall to the deck where it can be damaged or create a hazard to boat personnel. When this happens the dredge line must be rewound on the teaser reel as soon as possible.

In view of the problems and disadvantages of conventional teasers, the present invention was conceived and one of its objectives is to provide a teaser reel which will emit an audible signal to alert personnel in the event the dredge is struck by fish.

Another objective of the present invention is to provide a teaser alarm which will loudly, quickly notify the boat personnel of pending danger to the dredge.

Still another objective of the present invention is to provide an L-shaped line guide on the teaser reel which will assist in preventing the dredge line from inadvertently unwinding.

Yet another objective of the present invention is to provide a teaser reel having a cogwheel and pivotable pawl which is selectively positionable to emit a sound as the cogwheel rotates.

Various other objectives and advantages of the present invention will become apparent to those skilled in the art as a more detailed description is set forth below.

SUMMARY OF THE INVENTION

The aforesaid and other objectives are realized by providing a manual teaser reel having a handle for winding purposes. The teaser reel is mounted, for example on the standard tubular frame below a boat T-top using U-shaped brackets or can be bolted to a hard top or tower of a boat. An L-shaped dredge line guide is also affixed to the teaser reel to prevent the dredge line from inadvertently unwinding or falling from the teaser reel due to gravitational forces on the dredge line should it become slack. In addition, a cogwheel is rigidly affixed to the teaser reel with a pivotable pawl positioned on an elongated pivotable pawl support which allows the pawl to be positioned contiguous to the cogwheel for producing an alarm. A resilient spring keeper prevents the pawl from excessively pivoting. The elongated pawl support is positioned in a housing atop the reel and extends outwardly from the housing for manual manipulation as required. The housing includes a pair of indents to allow the pawl support to move from a first (indent) position to a second (indent) position on the housing to engage and disengage the pawl from the cogwheel so as the cogwheel turns the pawl moves back and forth in a "clicking" manner producing an audible alarm. The alarm is active in the first position as the pawl engages the cogwheel and inactive in the second position as the pawl is disengaged from the cogwheel. When the pawl is in the second position the dredge line can be unwound from the teaser reel and prepared for use in the water without an alarm sound. The second position also allows the reel to be loosened by the threaded knob and the dredge line wound on the teaser reel when use is completed without sound from the alarm. With the teaser in operation, as the fishing boat reaches a trolling speed the pawl support is rotated from the second position to the first position to engage the alarm in which the pawl is now contiguous to the cogs (alarm active) so as the cogwheel turns the pawl moves back and forth in a "clicking" manner as it engages each succeeding cog during revolution of the cogwheel. Contact between the cogs and the pawl causes a loud, shrill noise or sound which will alert nearby personnel. Thus if a fish strikes the dredge causing the dredge line to unwind from the spool, personnel are alerted and appropriate steps can be taken to protect the dredge from the striking fish such as by reeling in the dredge. In this way the dredge will be protected from the pursuing fish and hopefully the dredge line will not be broken by the striking fish.

DETAILED DESCRIPTION OF THE PREFERRED EMBODIMENT AND OPERATION OF THE INVENTION

Figure 1:
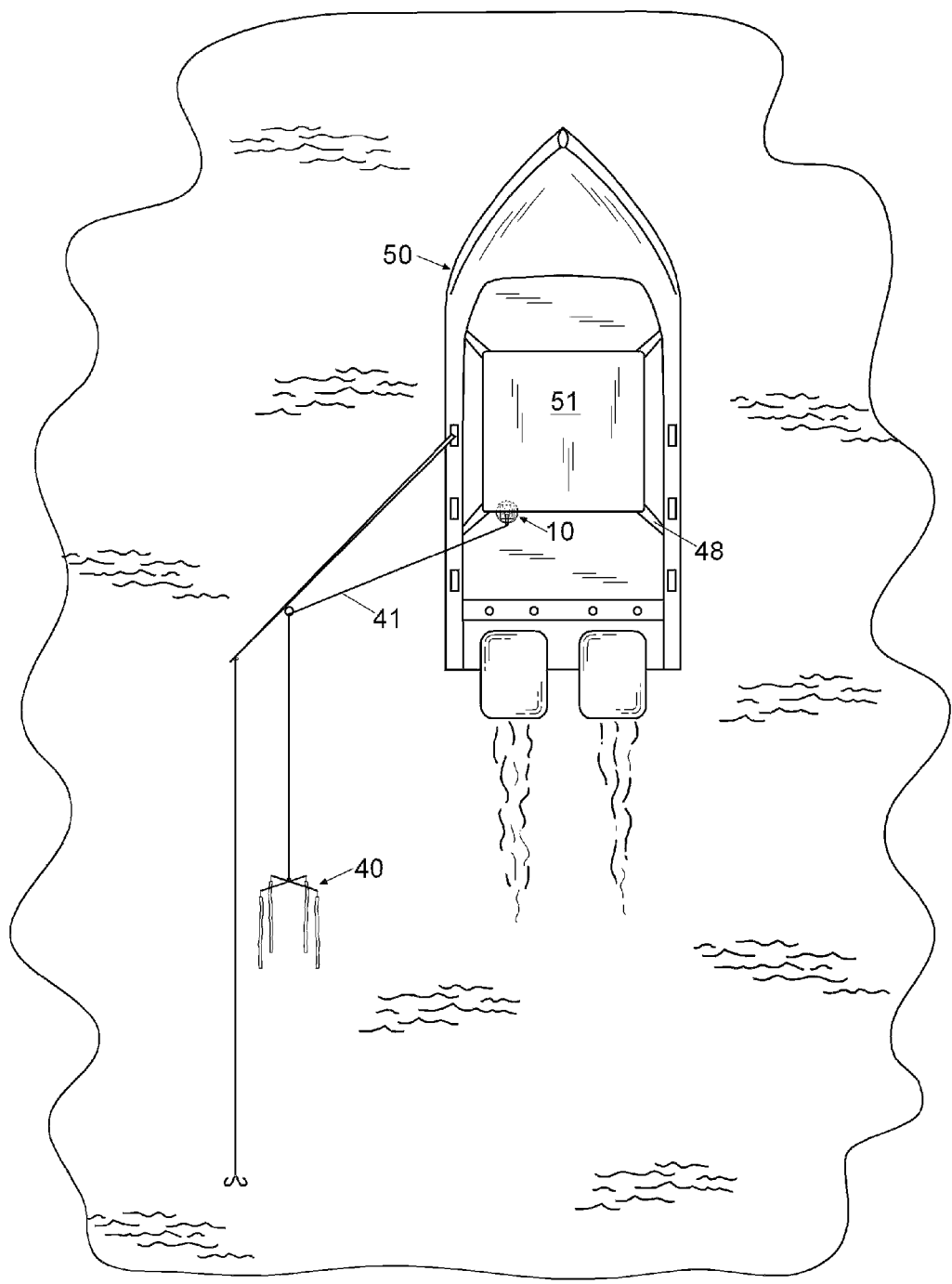
FIG. 1 shows a schematic top plan view of a typical small fishing boat with the teaser reel affixed underneath a conventional T-top.

For a better understanding of the invention and its method of use, turning now to the drawings, preferred teaser reel 10 formed from metal, preferably marine aluminum is shown in FIG. 1 mounted on typical boat 50 having T-top 51 on tubular frame 48. Boat 50 is in the process of trolling and includes dredge line 41 which is wound on spool 11 (FIG. 2) and is affixed to dredge 40. Teaser reel 10 is mounted to tubular frame 48 beneath T-top 51 over the boat console (not shown) as seen in FIG. 1 by U-shaped brackets 31 (FIG. 2) using bolts 52 (only one bolt seen).

Figure 2:
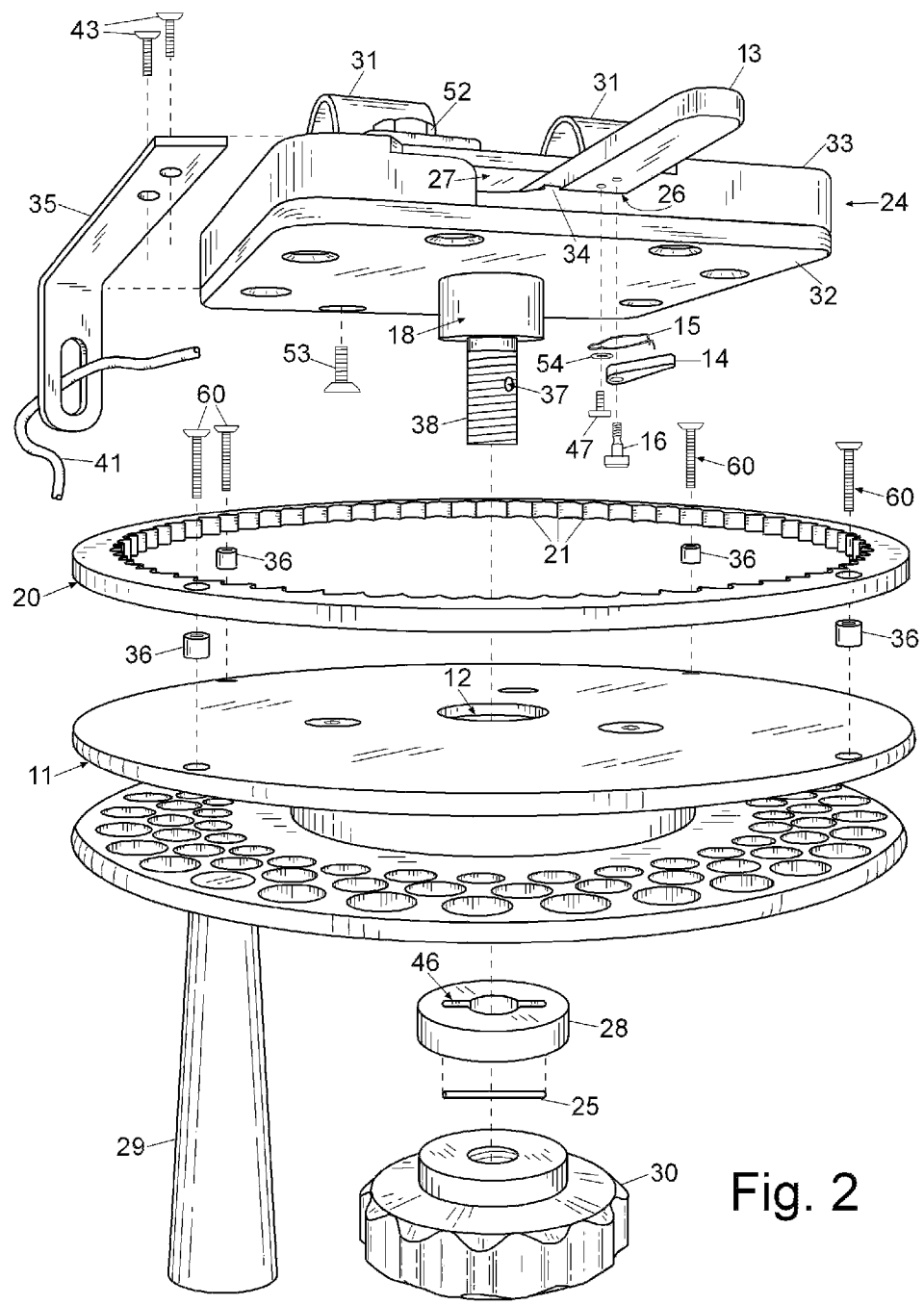
FIG. 2 illustrates the teaser reel of the invention in a perspective, exploded format.
Figure 3:
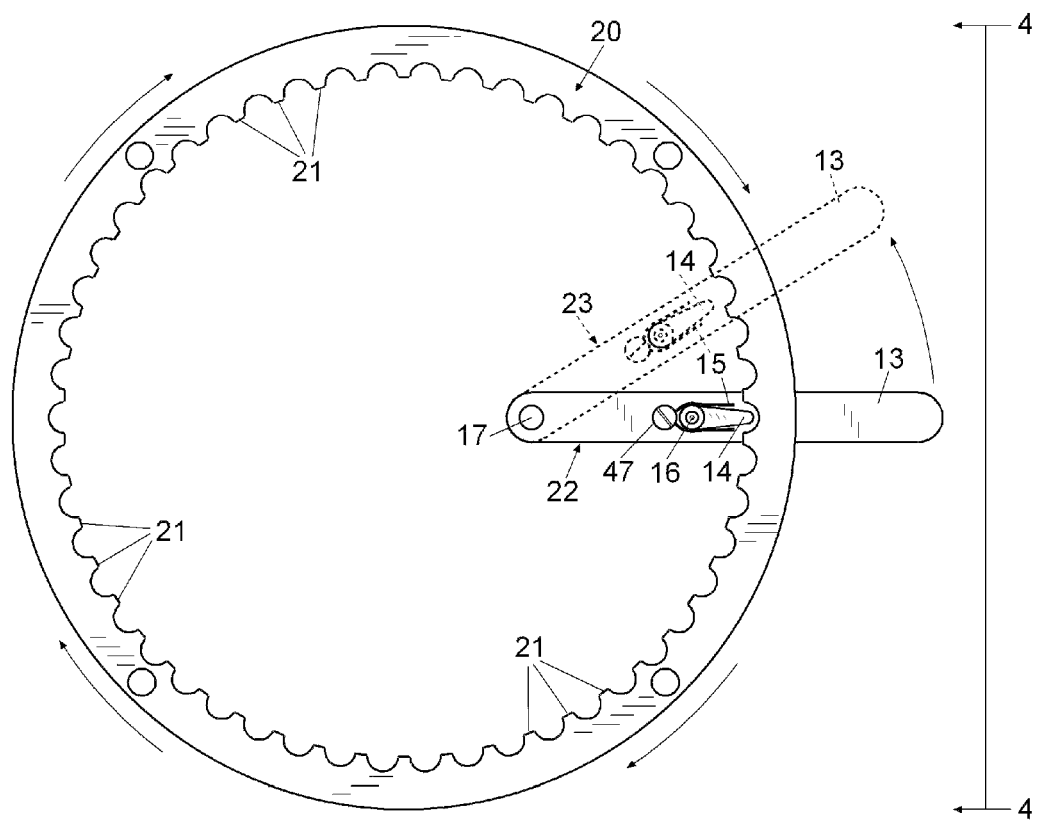
FIG. 3 demonstrates a schematic plan view of the bottom of the cogwheel with the pawl support in an active (alarm) first position and in dashed line format with the pawl in a second, inactive position.

As shown in exploded fashion in FIG. 2, teaser reel 10 includes conventional dredge line spool 11 with handle 29, cogwheel 20 with cogs 21, pawl support 13 with pawl 14 and spring keeper 15 of pawl support housing 24. Cogwheel 20 is affixed to spool 11 by screws 60 and threaded spacers 36 are utilized to distance cogwheel 20 from spool 11 for alignment and movement of pawl 14 in relation to cogwheel 20. As seen in FIG. 3 when engaged, pawl 14 contacts succeeding cogs 21 as cogwheel rotates past pivoting pawl 14 to emit a loud shrill "clicking" sound. This sound provides a sufficiently loud audible alarm to alert boat personnel (not shown) that dredge line 41 on spool 11 is unwinding, generally due to fish striking (not shown) dredge 40. When alerted, personnel can reel in dredge 40 using handle 29 before significant damage is caused thereto.

Elongated pawl support 13 is rotatable about pivot pin 17 (FIG. 3) which is affixed to pawl support housing 24. Pawl support 13 is shown in a first position 22 also seen in FIG. 4 allowing pawl 14 to pivotally engage cogs 21 to emit a shrill sound or alarm as cogwheel 20 rotates in a clockwise direction as seen in FIG. 3.

Pawl support housing 24 includes drag plate 32 and housing cover 33 which are joined together such as by conventional screws 53 (FIG. 2, only one shown). Drag plate 32 includes spool axle 18 having threaded stud 38 with pin channel 37 therein. Threaded stud 38 is positioned through spool channel 12 of spool 11 which is sized to receive spool axle 18. Drive lock spacer 28 which includes pin slot 46 is then placed over threaded stud 38 whereby pin 25 is then positioned within pin channel 37 and received within pin slot 46 whereby knob 30 is then tightened on threaded stud 38. Housing cover 33 includes apertures (not shown) for placement of U-shaped brackets 31 using bolts 52 and for placement of dredge line guide 35 using screws 43.

Figure 4:
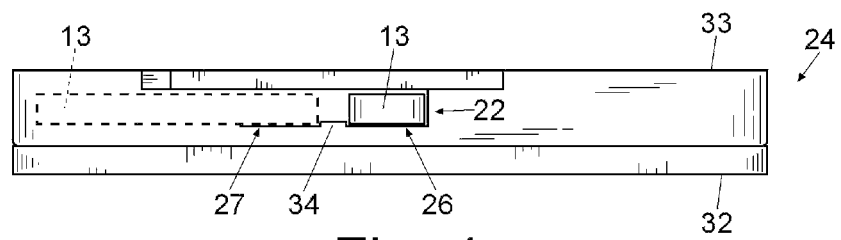
FIG. 4 depicts an elevational view of the pawl support housing as along lines 4-4 of FIG. 3 with the pawl support seen in the first position and seen in dashed lines in the second or inactive alarm position.

Pawl support housing cover 33 also defines slot 34 as seen in FIGS. 2 and 4 which includes first indent 26 and second indent 27 for slideably, selectively positioning pawl support 13 from a first "active" position to a second "inactive" position. Finger pressure is sufficiently applied to raise pawl support 13 to allow it to lift and slide back and forth between first position or indent 26 and second position or indent 27 as desired, within slot 34 to activate or deactivate the alarm.

Figure 5:
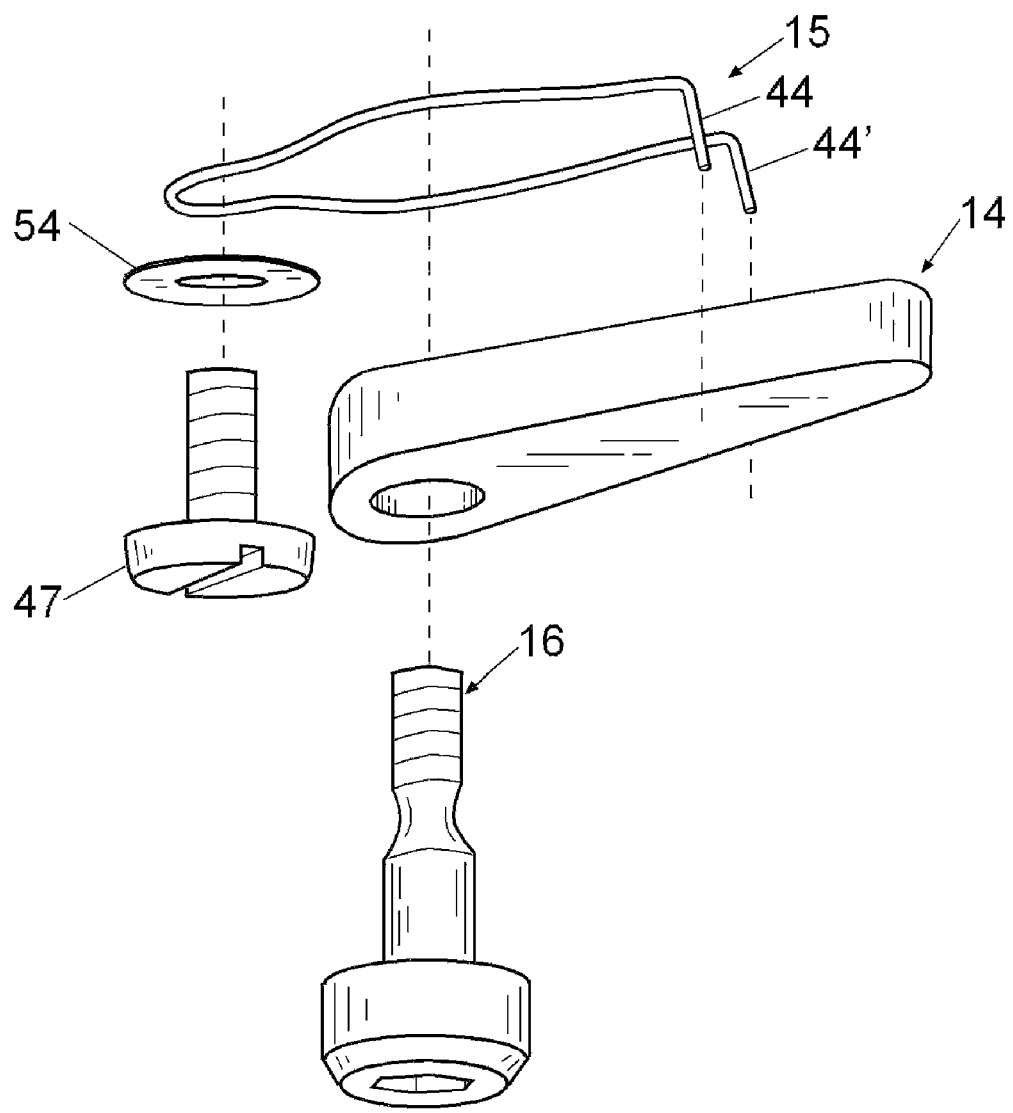
FIG. 5 pictures the pawl and pawl holder as removed from the teaser reel of the invention in an enlarged, perspective, exploded format.

As seen in FIG. 2 and enlarged in FIG. 5, spring keeper 15 consists of a thin diameter generally V-shaped resilient wire having a pair of normally extending arms 44, 44' and is affixed to pawl support 13 by screw 47 with washer 54 therebetween. Arms 44, 44' prevent excess pivotal movement of wedge shaped pawl 14 as pawl 14 contacts cogs 21. Arms 44, 44' subdue both clockwise and counterclockwise pivoting action of pawl 14 and rapidly returns pawl 14 to its dormant or center position, essentially linearly aligned with the longitudinal axis of pawl support 13 as pictured in FIG. 3. As also shown, pawl 14 pivots on threaded axle 16 (FIG. 3) mounted to pawl support 13 approximately thirty to thirty-five degrees)(30-35° as it strikes succeeding cogs 21 and emits a shrill alarm sound for alerting purposes. Should it be desirable to reel-in dredge line 41, pawl support 13 is moved from first position 22 in indent 26 to second position 23 in indent 27 as shown in FIG. 3 (dashed line), whereby pawl 14 is disengaged from cogs 21 so no audible sound is emitted.

L-shaped dredge line guide 35 as shown in FIG. 2 is formed from metal and is rigidly affixed to teaser reel 10 preferably with screws 43, but bolts or other similar mechanical fasteners could also be used. Line guide 35 properly maintains dredge line 41 on teaser reel 10 as dredge 40 is pulled through the water by boat 50 while trolling and dredge line 41 will not inadvertently unwind by gravitational forces from spool 11. Inadvertent unwinding of dredge line 41 from spool 11 can cause various problems including safety issues to personnel that are standing or walking near teaser reel 10.

During assembly of teaser reel 10, knob 30 is threaded onto stud 38 seen in FIG. 2 and tightened when it is desirable to prevent spool 11 from winding or unwinding dredge line 41. Polymeric drive lock spacer 28 fits a channel (not shown) on the bottom of spool 11 and stud 38 extends therethrough. Drive lock spacer 28 is "locked" in place on threaded stud 38 with pin 25 which passes through pin channel 37 and is positioned within pin slot 46 of drive lock spacer 28. Spool 11 also includes channel 12 which receives spool axle or bearing 18 affixed to drag plate 32 bolted to housing cover 33.

The illustrations and examples provided herein are for explanatory purposes and are not intended to limit the scope of the appended claims.

We claim:

1. A teaser reel for use in dredging comprising: a spool, a cogwheel, said cogwheel defining a plurality of inwardly-facing internal cogs, said cogwheel attached to said spool, a rotatable elongated flat pawl support, a pawl support housing, said pawl support contained within said pawl support housing, said pawl support housing mounted on said spool, a pawl, said pawl pivotally mounted on said pawl support, a pivot pin, said pivot pin contained within said pawl support housing, said pawl support rotatably mounted on said pivot pin, wherein said pawl support is rotatable about said pivot pin to engage said pawl with said cogs of said cogwheel and said pawl support is rotatable to disengage said pawl from said cogs by said pawl support wherein rotation of said cogwheel when engaged by said pawl will cause said pawl to emit an audible sound.

2. The teaser reel of claim 1 wherein said pawl is mounted exteriorly of said pawl support housing and entirely positioned within said cogwheel.

3. The teaser reel of claim 1 wherein said pawl defines sides and a rounded tip, a V-shaped resilient keeper, said keeper positioned along said sides of said pawl to limit pivoting of said pawl.

4. The teaser reel of claim 1 further comprising a line guide, said line guide attached to said teaser reel.

5. The teaser reel of claim 1 wherein said pawl support is rotatable to a first position to allow said pawl to engage said cogwheel and selectively rotatable to a second position to disengage said pawl from said cogwheel.

6. The teaser reel of claim 1 wherein said pawl support housing defines a first indent, said pawl support positionable in said first indent to allow said pawl to engage said cogwheel.

7. The teaser reel of claim 6 wherein said pawl support housing defines a second indent, said pawl support positionable in said second indent to allow said pawl to disengage said cogwheel.

8. A teaser mounted to a boat to attract fish, said teaser comprising: a dredge, a dredge line, one end of said dredge line attached to said dredge, a teaser reel, said teaser reel comprising a spool, a cogwheel, said cogwheel affixed to said spool, a pawl, a rotatable elongated flat pawl support, a pivot pin, a pawl support housing, said pawl support housing attached to said spool, said pivot pin mounted within said pawl support housing, said pawl support rotatably mounted on said pivot pin, said pawl pivotally mounted on said pawl support, said cogwheel defining a plurality of inwardly-facing internal cogs, wherein said pawl support is rotatable about said pivot pin to engage said pawl with said cogs and said pawl support is rotatable to disengage said pawl from said cogs, and the other end of said dredge line attached to said spool.

9. The teaser reel of claim 1 further comprising a stud, said stud attached to said pawl support housing, a knob, said knob connected to said stud, said knob tightenable on said stud to prevent spool movement.

10. The teaser reel of claim 9 wherein said stud defines a channel, a spacer, said spacer positioned on said stud, said spacer defining a pin slot, a stud pin, said stud pin residing in said pin slot and in said channel.

* * * * *